(12) United States Patent
Chung et al.

(10) Patent No.: US 10,794,867 B2
(45) Date of Patent: Oct. 6, 2020

(54) SYSTEM AND METHOD OF DIAGNOSING TUBE SENSOR INTEGRITY BY ANALYSIS OF EXCITED STRESS WAVES

(71) Applicant: ACELLENT TECHNOLOGIES, INC., Sunnyvale, CA (US)

(72) Inventors: Hung Chi Chung, San Jose, CA (US); Mark Pappakostas, San Jose, CA (US); Irene J. Li, Stanford, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 0 days.

(21) Appl. No.: 14/730,112

(22) Filed: Jun. 3, 2015

(65) Prior Publication Data

US 2015/0346161 A1    Dec. 3, 2015

Related U.S. Application Data

(60) Provisional application No. 62/007,329, filed on Jun. 3, 2014.

(51) Int. Cl.
*G01N 29/04*      (2006.01)
*G01N 29/48*      (2006.01)
(Continued)

(52) U.S. Cl.
CPC ......... *G01N 29/043* (2013.01); *G01N 29/223* (2013.01); *G01N 29/48* (2013.01);
(Continued)

(58) Field of Classification Search
CPC ........... G01N 2291/048; G01N 29/043; G01N 29/223; G01N 29/2634; G01N 29/265; G01N 29/245
(Continued)

(56) References Cited

U.S. PATENT DOCUMENTS 3,552,191 A * 1/1971 Heseding ............. G01N 29/043
73/624
4,210,028 A * 7/1980 Hildebrand ............. G01L 1/255
73/598
(Continued)

FOREIGN PATENT DOCUMENTS

JP      02262051 A * 10/1990 ............. G01N 29/11

OTHER PUBLICATIONS

Karpelson et al, Non-Conventional Ultrasonic Techniques for Tube Testing, NDT.net Apr. 2004 vol. 9 No. 04.*
(Continued)

*Primary Examiner* — David L Singer
(74) *Attorney, Agent, or Firm* — Haley Guiliano LLP (57) ABSTRACT

A structural health monitoring apparatus is presented. According to an embodiment, the structural health monitoring apparatus comprises: a plurality of transducers configured for coupling to a structure, the structure comprising an outer structure surrounding and coupled to an inner structure, the transducers further configured for coupling to only the outer structure so as to transmit stress waves through the inner structure, and still further configured to receive the transmitted stress waves from the outer structure after they have passed through the inner structure; and an analyzer configured to detect damage within the inner structure according to the received transmitted stress waves from the outer structure.

11 Claims, 10 Drawing Sheets

(51) Int. Cl.
    *G01N 29/265*     (2006.01)
    *G01N 29/22*     (2006.01)
    *G01N 29/24*     (2006.01)
    *G01N 29/34*     (2006.01)

(52) U.S. Cl.
    CPC ..... *G01N 29/2437* (2013.01); *G01N 29/2462* (2013.01); *G01N 29/265* (2013.01); *G01N 29/343* (2013.01); *G01N 2291/015* (2013.01); *G01N 2291/0232* (2013.01); *G01N 2291/0289* (2013.01); *G01N 2291/044* (2013.01); *G01N 2291/048* (2013.01); *G01N 2291/105* (2013.01); *G01N 2291/2634* (2013.01)

(58) Field of Classification Search
    USPC ................. 73/600, 622, 617, 628, 602, 644
    See application file for complete search history.

(56) References Cited

U.S. PATENT DOCUMENTS

| | | | | |
|---|---|---|---|---|
| 4,483,932 A * | 11/1984 | Washburn | ............. | C04B 35/047 501/117 |
| 4,549,437 A * | 10/1985 | Weins | ................... | G01N 29/14 73/587 |
| 4,651,568 A * | 3/1987 | Reich | .................... | G01N 29/11 73/612 |
| 4,979,394 A * | 12/1990 | Higo | ....................... | G01N 29/12 73/602 |
| 5,637,799 A * | 6/1997 | Heyman | ................ | G01N 29/07 73/598 |
| 6,632,017 B1 * | 10/2003 | Cress | ....................... | G01K 7/04 136/230 |
| 2003/0037615 A1 * | 2/2003 | Madaras | .............. | G01N 29/045 73/598 |
| 2006/0196271 A1 * | 9/2006 | Jancsik | ................ | G01N 29/022 73/579 |
| 2011/0023609 A1 * | 2/2011 | Ume | ....................... | G01N 29/11 73/600 |
| 2011/0040496 A1 * | 2/2011 | Banerjee | ............. | G01M 5/0033 702/34 |
| 2014/0305216 A1 * | 10/2014 | Hafenrichter | .......... | G01N 29/07 73/598 |
| 2015/0247823 A1 * | 9/2015 | Gil | ....................... | G01N 29/043 73/602 |

OTHER PUBLICATIONS

Federal Aviation Administration, Airworthiness Directives Proposed Rule, Oct. 19, 2011.*
Hashemian, Special Section: Temeprature & Pressure: The Temperature Tango, Jun. 2010.*
Big Ceramic Store, Titp #89: Thermocouples, Jun. 23, 2013.*
Daily Thermetrics, Thermowells Daily Thermetrics Product Advantages, (Year: 2010).*
Ekvall et al, VIII. T-111 Alloy Cracking Problems During Processing and Fabrication (Year: 1970).*
Abdul-Aziz, Non-destructive Testing of Ceramic Materials, Materials Evaluation, vol. 64, No. 1, pp: 20-22, The American Society for Nondestructive Testing, Inc. (Year: 2006).*
Marjon Ceramics, Pyrometer Tips (Year: 2007).*
Coulton Instrumentation, Data Sheet (Year: 1996).*

* cited by examiner

SYSTEM AND METHOD OF DIAGNOSING TUBE SENSOR INTEGRITY BY ANALYSIS OF EXCITED STRESS WAVES

CROSS-REFERENCE TO RELATED APPLICATIONS

This application claims priority to, and the benefit of, U.S. Provisional Patent Application No. 62/007,329 titled "System Overview and Performance on Tube Sensors" and filed on Jun. 3, 2014, the entire content of which is incorporated herein by reference.

RELATED FIELD

The present disclosure relates in general to structural health monitoring (SHM), and in particular, to a system and method of evaluating the integrity of tube sensors.

BACKGROUND

A tube sensor generally includes a sensor housed in a tube structure designed to insulate the sensor from harsh environmental conditions (e.g, deleterious gases, corrosive fluids, extreme pressures/temperatures, mechanical stress). The tube sensor may be an alloy-ceramic tube sensor having a composite tube structure in which a ceramic tube is bonded to an alloy tube. As an example, an alloy-ceramic tube sensor for sensing temperature may include a thermocouple housed in a ceramic inner tube sheathed in an alloy outer tube. The ceramic inner tube may be spaced apart from and affixed to the alloy outer tube by glass joints formed between them.

Tube sensors may be used in a number of industrial and commercial applications in which the tube sensors are subject to constant and strong mechanical vibrations. As a result, structural defects may develop in the tube sensors, especially in the more brittle components. In the case of an alloy-ceramic tube sensor, cracks may form in the ceramic inner tube and the glass joints. However, because the alloy outer tube encapsulates at least a portion of the ceramic inner tube and the glass joints, it may be difficult to inspect the ceramic inner tube and the glass joints for defects in a nondestructive manner. Nevertheless, it is desirable to detect such defects, as they lower the structural integrity and reliability of the tube sensor and may lead to contamination of the sensor and inaccurate measurements.

In view of the foregoing, there exists a need for a system and method of evaluating the integrity of tube sensors.

SUMMARY

In one aspect, the present disclosure provides a structural health monitoring apparatus, comprising: a plurality of transducers configured for coupling to a structure, the structure comprising an outer structure surrounding and coupled to an inner structure, the transducers further configured for coupling to only the outer structure so as to transmit stress waves through the inner structure, and still further configured to receive the transmitted stress waves from the outer structure after they have passed through the inner structure; and an analyzer configured to detect damage within the inner structure according to the received transmitted stress waves from the outer structure.

In another aspect, the present disclosure provides a method of conducting structural health monitoring of a structure comprising an outer structure surrounding and coupled to an inner structure, the method comprising: sending excitation signals to a plurality of transducers coupled to the outer structure to cause the transducers to generate stress waves within the outer structure, so that the stress waves propagate through the outer structure and into the inner structure; receiving from the transducers response signals corresponding to the stress waves that have returned to the outer structure from the inner structure; and determining a presence of damage in the inner structure on the basis of the received response signals.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide a system and method of evaluating the integrity of tube sensors. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As mentioned above, it may be difficult to evaluate the integrity of a tube sensor having a composite tube structure without causing damage to the tube sensor. Particularly, structural defects in an internal tube and underlying joints of the tube structure are usually not readily observable when sheathed in an external tube. As defects may develop over the course of use and lead to erroneous measurements, it would be advantageous to be able to detect defects so that a defective tube sensor can be promptly replaced. The present disclosure provides a system and method of evaluating the integrity of a tube sensor on the basis of an acoustic energy profile obtained for the tube sensor. According to an exemplary embodiment, the present system and method obtain an acoustic energy profile over a plurality of regions of a tube sensor and analyze the acoustic profile to determine if one or more of the regions contain internal structural defects.

Figure 1A:
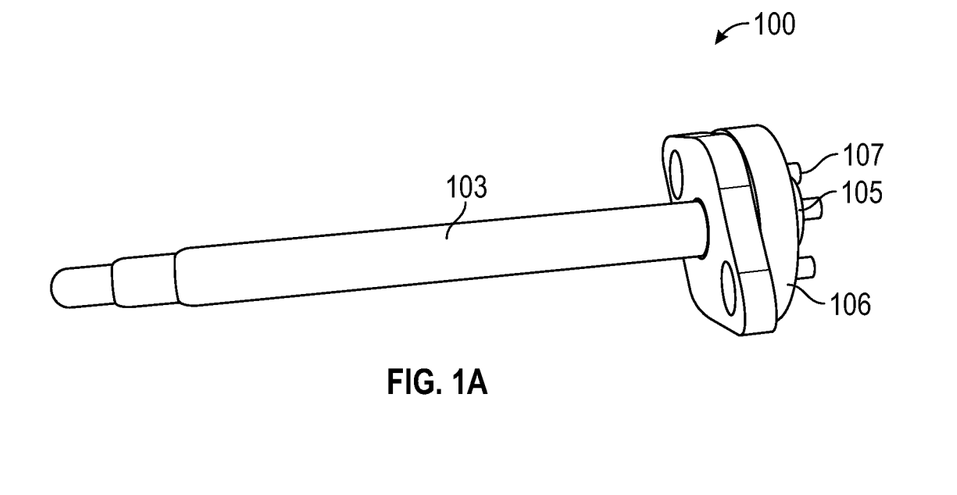
FIGS. 1A and 1B illustrate external and internal views of an exemplary tube sensor whose integrity may be evaluated using the system and method disclosed herein.
Figure 1B:
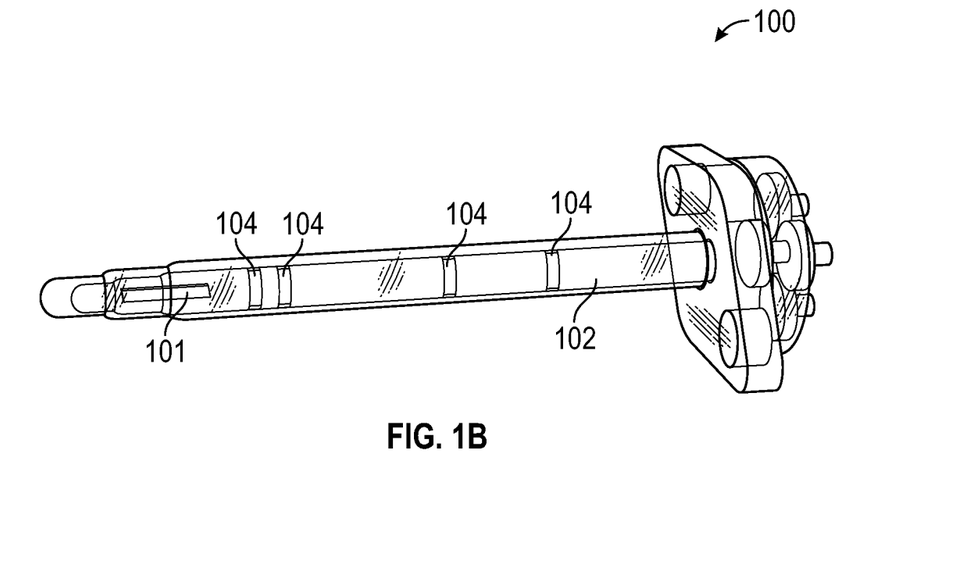

FIGS. 1A and 1B illustrate external and internal views of an exemplary tube sensor whose integrity may be evaluated using the system and method disclosed herein. The tube sensor 100 includes a sensing device which, in this case, is a thermocouple 101. The thermocouple 101 is housed in a composite tube structure comprising a ceramic inner tube 102 sheathed in an alloy outer tube 103. The ceramic inner tube 102 is spaced apart from, and affixed to, the alloy outer tube 103 by glass joints 104. The glass joints may be formed, for example, by glass frit bonding. FIG. 1B shows four glass joints 104, but there may be any number of glass joints. The composite tube structure is connected to a ceramic enclosure 105 and a metal cup 106 at one end. The metal cup 106 includes electrodes 107 that are connected to the wires (not shown) of the thermocouple 101 so that an external device (not shown) may send and receive signals from the thermocouple 101. Because the tube sensor 100 may be used as a high temperature sensor in a high-vibration environment, structural defects may develop over time, particularly in brittle areas such the glass joints 104 and in the ceramic inner tube 102 where the glass joints 104 are formed.

Figure 2:
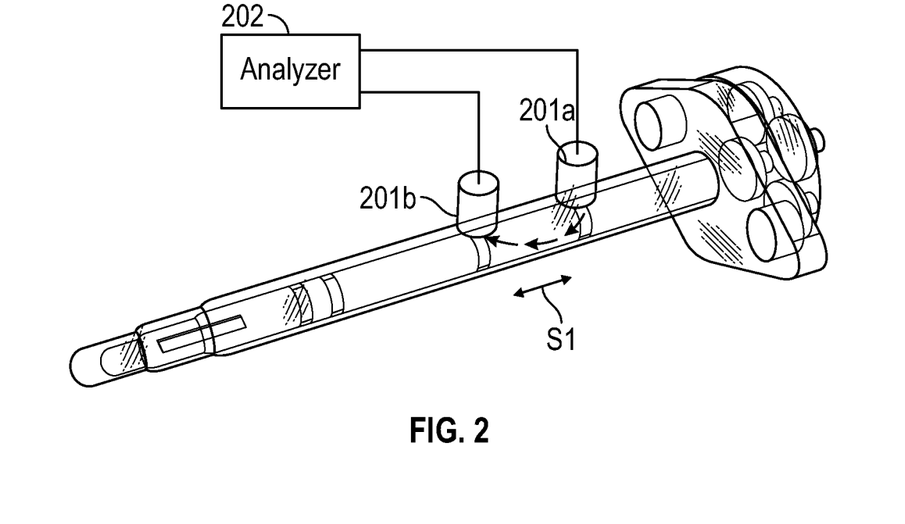
FIG. 2 illustrates using a pitch-catch mode to detect defects in a tube sensor, according to an exemplary embodiment of the present system and method.
Figure 3:
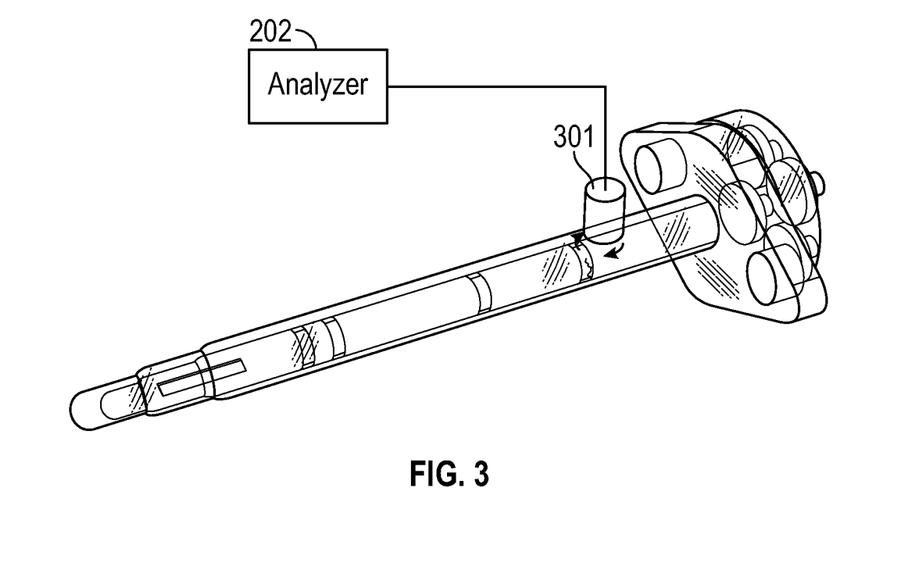
FIG. 3 illustrates using a pulse-echo mode to detect defects in a tube sensor, according to an exemplary embodiment of the present system and method.

FIGS. 2 and 3 illustrate two active scan modes for detecting defects in a tube sensor, according to exemplary embodiments of the present system and method. Particularly, FIG. 2 illustrates using a pitch-catch mode to scan for defects, and FIG. 3 illustrates using a pulse-echo mode to scan for defects.

In FIG. 2, an analyzer is operably connected to a first transducer 201a and a second transducer 201b, which are spaced apart from each other along the length of the tube sensor 100. The distance at which the transducers 201a and 201b are spaced apart may vary according to different embodiments. Generally, the smaller the distance between the transducers 201a and 201b, the greater is the signal-to-noise ratio of the response signal. The transducers 201a and 201b contact different regions of an outer surface of the tube sensor 100, either directly or indirectly through an intervening medium, such as a waveguide, which is further described below.

In pitch-catch mode, the analyzer sends an excitation signal to the first transducer 201a. The excitation signal, which may be an electrical signal, is converted by the first transducer 201a into a stress wave that is propagated through the tube sensor 100. The stress wave propagates through the section S1 of the tube sensor 100 between transducers 201a and 201b and is detected by the second transducer 201b. The stress wave may propagate, for example, from the outer structure of the tube sensor to the inner structure and back to the outer structure via the glass joints connecting them. The second transducer 201b converts the detected stress wave into a response signal, which may be an electrical signal, and sends it back to the analyzer. The analyzer receives the response signal and analyzes the response signal to determine the acoustic energy of the response signal. In some embodiments, the acoustic energy level of the response signal may be calculated as an energy loss ratio E.L.R using the following equations $$E.L.R = (1 - R_{M,N}) \times 100\%$$

and $$R_{M,N} = \frac{\text{Sum}\{abs[\text{Time Signal at Station } M(t_1, t_2)]\}}{\text{Sum}\{abs[\text{Time Signal at Station } N(t_1, t_2)]\}}$$

where $t_1$ is the beginning of the selected time window, which is calculated from the arrival time from the transduction to the receiving of response signal, and $t_2$ is the end of the selected time window.

The pair of transducers 201a and 201b may be moved and placed over different sections along the length of the tube sensor 100, or multiple transducers may be used, so that the acoustic energy of different sections of the tube sensor 100 may be measured. Accumulating acoustic energy readings for different sections of the tube sensor 100 enables the analyzer to generate an acoustic energy profile for the tube sensor 100 and to determine whether structural defects exist in one or more of the sections, on the basis of the acoustic profile. For example, if a crack exists in a section S1, the response signal measured for that section may have lower acoustic energy compared to that of a response signal measured in another section that does not have a crack. In other words, defective tube sensors exhibit a quantifiable energy transmission loss due to damage, and the condition of a tube sensor can thus be evaluated by its ability to efficiently transfer a diagnostic waveform from one transducer to another transducer.

Figure 4A:
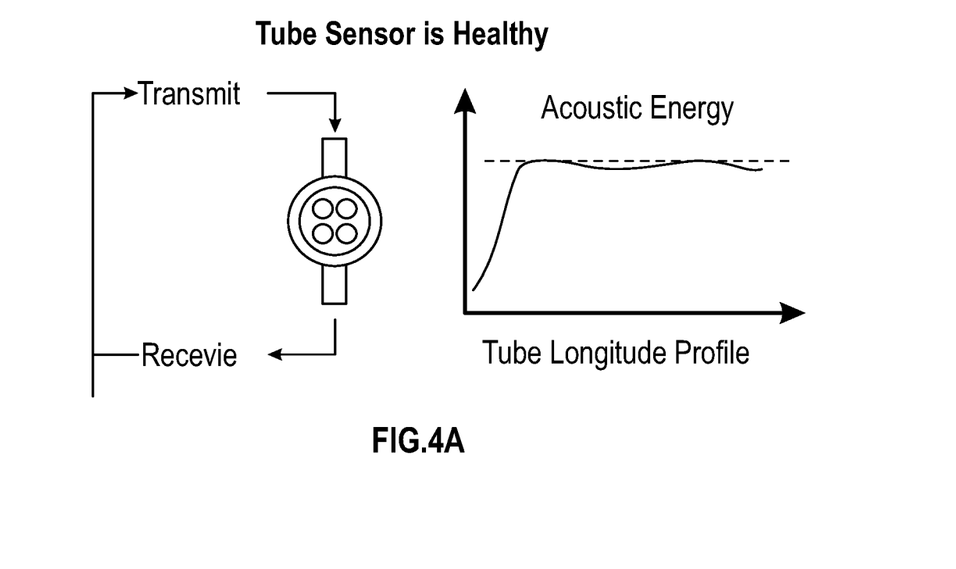
FIGS. 4A and 4B illustrate exemplary acoustic energy profiles for an undamaged tube sensor and a damaged tube sensor.
Figure 4B:
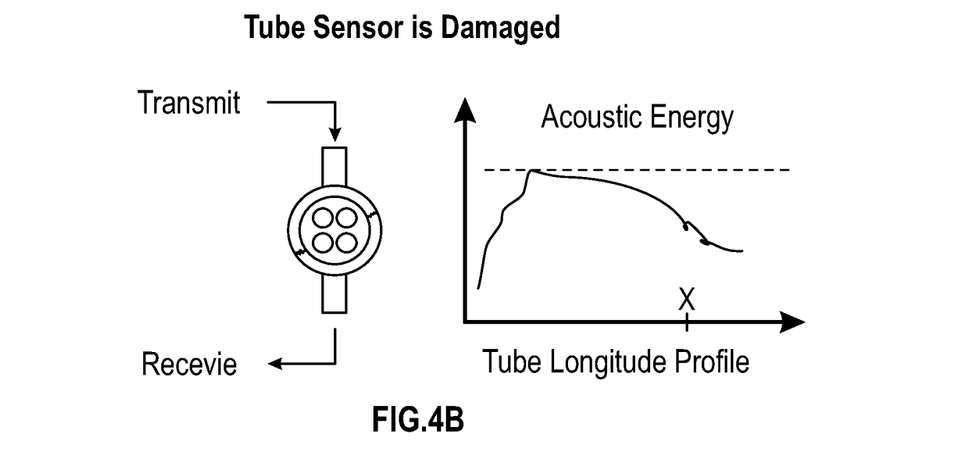

FIGS. 4A and 4B illustrate exemplary acoustic energy profiles for an undamaged tube sensor and a damaged tube sensor. In particular, FIG. 4A shows that when the tube sensor is undamaged, the acoustic energy level of the measured response signals does not vary significantly along the length of the tube sensor. FIG. 4B, on the other hand, shows that when the tube sensor is damaged at a location X along its length, the acoustic energy level of the response signals measured at or around location X is lower than the acoustic energy level of the response signals measured at other locations along the tube sensor. That is, a dip in the acoustic energy profile corresponding to location X indicates that the tube sensor is damaged at that location. Thus, by generating and analyzing an acoustic energy profile of the tube sensor 100, the analyzer is able to determine if and where a structural defect exists in the tube sensor 100 without the need for predetermined baseline data gathered from an undamaged tube sensor.

Although FIG. 2 shows that the first transducer 201a converts an electrical signal into a stress wave and the second transducer 201b converts a stress wave into an electrical signal, each of the transducers 201a and 201b may be capable of two-way conversion. That is, the first transducer 201a may also be capable of converting a stress wave into an electrical signal, and the second transducer 201b may also be capable of converting an electrical signal into a stress wave. In one embodiment, the transducers 201a and 201b may be piezoelectric actuator/sensors, e.g., lead-zirconate-titanate (PZT) transducers, capable of both exciting and detecting stress waves which propagate through paths in the tube sensor 100 from one transducer to another. Transducers 201a and 201b may be operated in a pulsed mode, i.e., a mode wherein a short burst of an electrical excitation signal applied thereto produces a resonant elastic response that produces stress waves in the structure. These stress waves may then propagate uniformly in all directions through the tube sensor 100, or alternatively, the transducers 201a and 201b may be configured to propagate stress waves in preferred directions.

Figure 5:
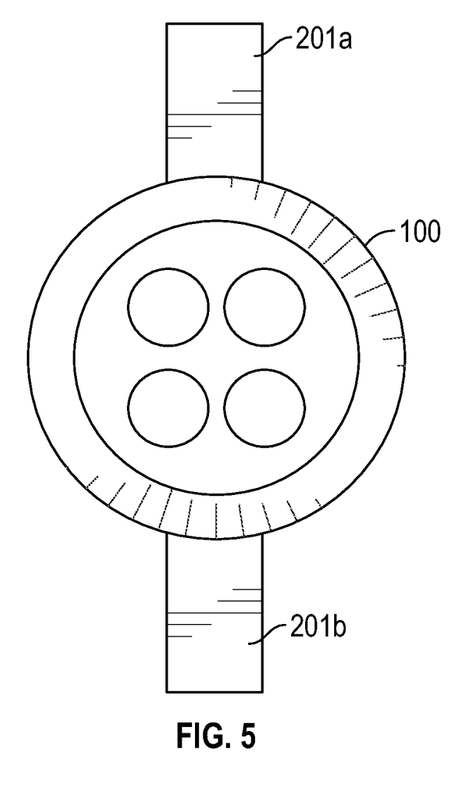
FIG. 5 illustrates using the pitch-catch mode for detecting defects in a tube sensor in which the transducers are spaced apart by the cross-sectional width of the tube sensor.

Furthermore, although FIG. 2 shows the transducers 201a and 201b as being spaced apart along the length of the tube sensor 100, the transducers 201a and 201b may also be placed at the same location along the length of the tube sensor 100 but on opposite sides of the tube sensor 100. That is, the pitch-catch mode of scanning for defects described with respect to FIG. 2 may also be applied when the transducers 201a and 201b are spaced apart by the cross-sectional width of the tube sensor, such as shown in FIG. 5.

In FIG. 3, which illustrates an example of using a pulse-echo mode to scan for defects, an analyzer is operably connected to a transducer 301. The transducer 301 may directly or indirectly contact an outer surface of the tube senor 100, such as at a region proximate to a glass joint. In pulse-echo mode, the analyzer sends an excitation signal to the transducer 301. The excitation signal, which may be an electrical signal, is converted by the transducer 301 into a stress wave that is generated in, and begins propagating through, the tube sensor at time t1. The stress wave is reflected back by the glass joint to the transducer 301 at time t2. The transducer 301 converts the reflected stress wave into a response signal, which may be an electrical signal, and sends the response signal back to the analyzer. The analyzer receives the response signal and analyzes the response signal to determine the acoustic energy of the echo signal.

The transducer 301 may be moved and placed at different locations along the length of the tube sensor, such as near the other glass joints, or multiple transducers may be used, so that the acoustic energy of response signals may be determined at multiple locations. Accumulating the acoustic energy readings at these locations enables the analyzer to generate an acoustic energy profile for the tube sensor and to determine whether structural defects exist on the basis of the acoustic profile. For example, because a crack exists in the glass joint, the response signal measured near the cracked glass joint may have lower acoustic energy compared to that of a response signal measured near a glass joint that is not cracked. Thus, a cracked glass joint may be identified on the basis of the acoustic energy profile.

Figure 6:
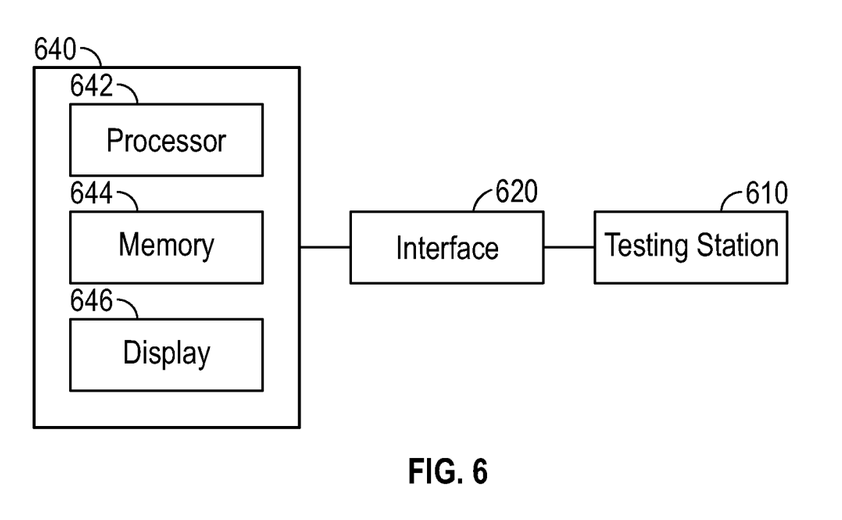
FIG. 6 shows a functional block diagram of a test setup for evaluating the integrity of a tube sensor, according to an exemplary embodiment of the present system and method.

An exemplary embodiment of the present system and method may be implemented using a combination of diagnostic hardware and software. For example, FIG. 6 shows a functional block diagram of a test setup for evaluating the integrity of a tube sensor, according to an exemplary embodiment of the present system and method. The test setup comprises a testing station 610 for testing a tube sensor for damage. The testing station 610 is operably coupled to an interface 620 for communication of signals and data to and from a computer 640. The computer 640 comprises a processor 642 and a memory 644, and may further include a display 646, which may be internal or external to the computer 640. In the particular embodiment of FIG. 6, the display 646 is disposed internal to the computer 640. The processor 642 is operable to execute a plurality of executable codes, which may be stored in the memory 644. The plurality of executable codes may include, for example, code for generating an excitation signal, determining the acoustic energy of a received response signal, generating an acoustic energy profile, and determining if and where a structural defect exists on the basis of the generated acoustic energy profile. In addition, the memory 644 may receive data comprising the acoustic energy level of received response signals from processor 642 for the purpose of generating an acoustic energy profile. The display 646 or other equivalent output means (not illustrated) may be provided for presentation of damage detection information.

Figure 7A:
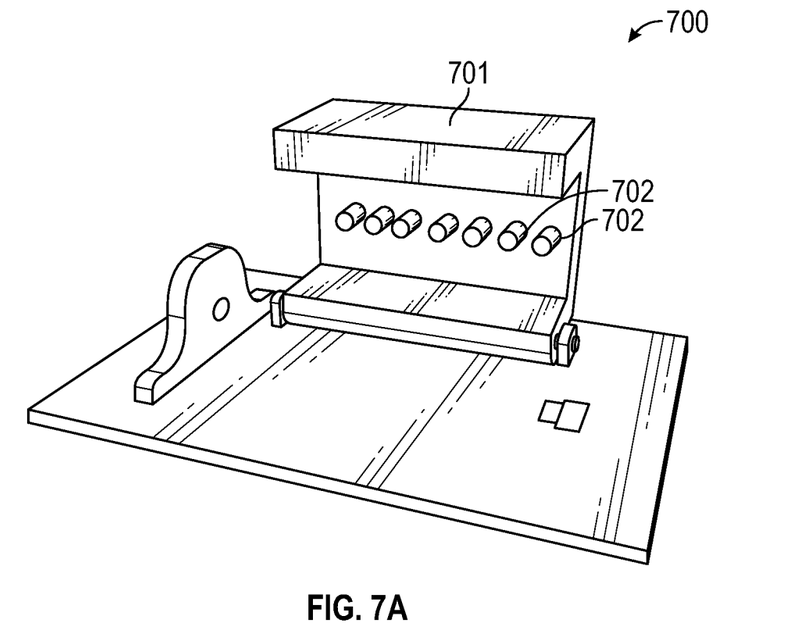
FIGS. 7A, 7B, and 7C illustrate perspective views of a testing station for testing a tube sensor, according to an exemplary embodiment of the present system and method.
Figure 7B:
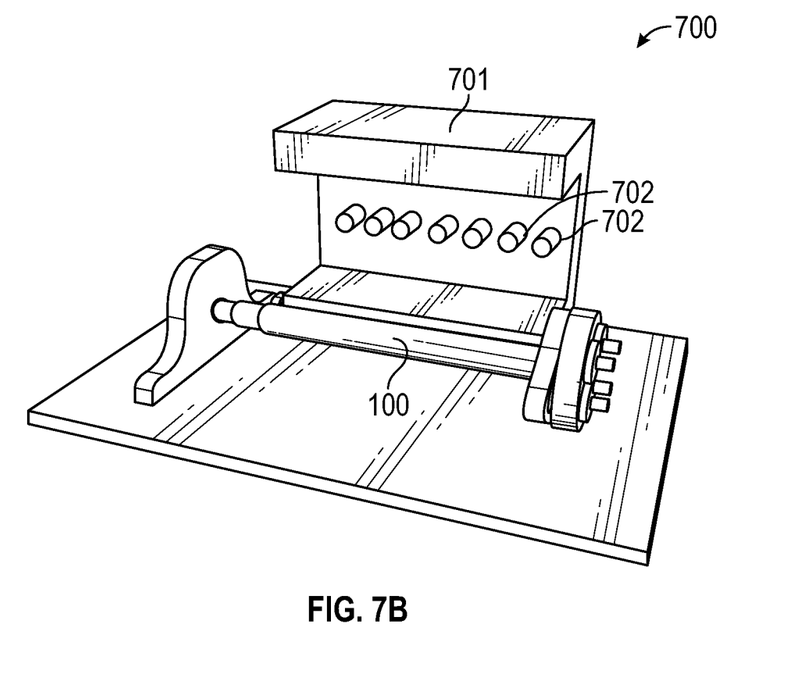
Figure 7C:
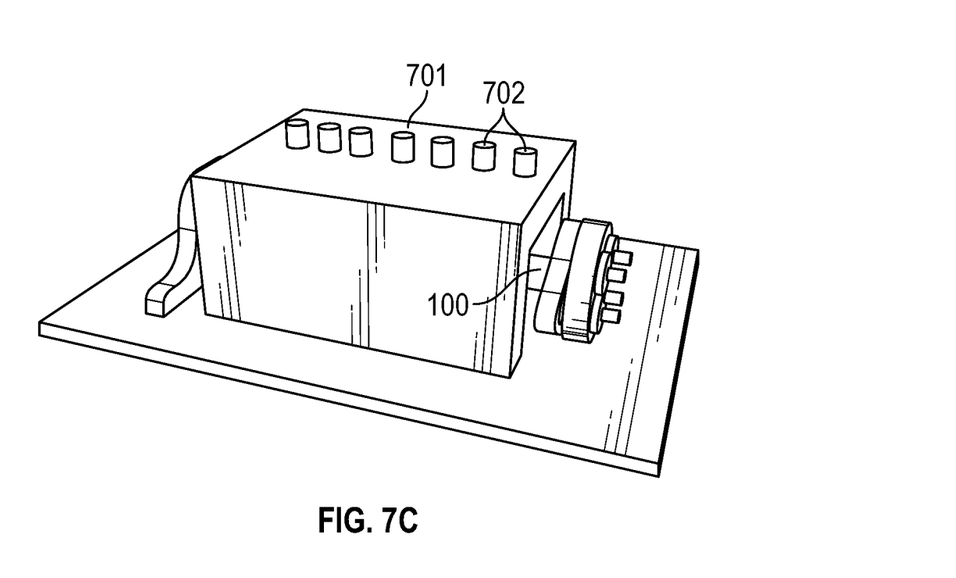

FIGS. 7A, 7B, and 7C illustrate perspective views of a testing station for testing a tube sensor, according to an exemplary embodiment of the present system and method. FIG. 7A shows the testing station with its top in an up position. FIG. 7B shows the testing station with a tube sensor placed thereon and its top in the up position. FIG. 7C shows the testing station with its top in a down position so that waveguides attached to the top make contact with the tube sensor.

As FIG. 7A illustrates, the testing station 700 has a hinged top 701 with a number of holes machined therein. In some embodiments, the top 701 may be made of a clear plastic material. A waveguide 702 attached to an SHM sensor (not shown) is affixed within each hole. The SHM sensor may be, for example, the transducer 201a of FIG. 2 and may be a piezoelectric transducer (PZT). In some embodiments (not shown), instead of the waveguides, the SHM sensors may be affixed within each hole so that the SHM sensors directly contact the tube sensor when the tube sensor is under test.

With the top 701 folded up, a tube sensor 100 or test specimen may be placed within the testing station 700, such as shown in FIG. 7B. Thereafter, the top 701 may be folded down upon the tube sensor so that the waveguides 702 are brought into contact with the tube sensor, such as shown in FIG. 7C. In this manner, with each of the waveguides 702 being in contact with the tube sensor under test, diagnostic signals (i.e., excitation and response signals) may be transmitted through and received from the tube sensor.

Applying the waveguides 702 in a linear configuration along one side of the tube sensor, as shown in FIG. 7C, often suffices to detect damage within the inner structure of the tube sensor. That is, it may not be necessary to surround the tube sensor with waveguides. As long as the waveguides 702 are placed in positions sufficient to allow the propagation and detection of stress waves into and out of the inner structure, damage detection can often be performed.

In another embodiment (not shown), the waveguides may be adjustably attached to the top of the test station so that the location of the waveguides may be changed. For example, instead of fixed holes within which the waveguides are placed, a slot may be provided in the top of the testing station so that the waveguides can be secured at various locations along the length of the slot, which would allow the waveguides to contact a range of locations along the tube sensor, rather than just the preset locations corresponding to the holes shown in FIG. 7A. This added degree of freedom may prove advantageous, for example, if the locations of the glass joints along the length of the tube sensor are not known. By scanning the waveguides along the length of the tube sensor to create an acoustic profile of the tube sensor, the locations of the glass joints may be identified from the acoustic profile.

Figure 8:
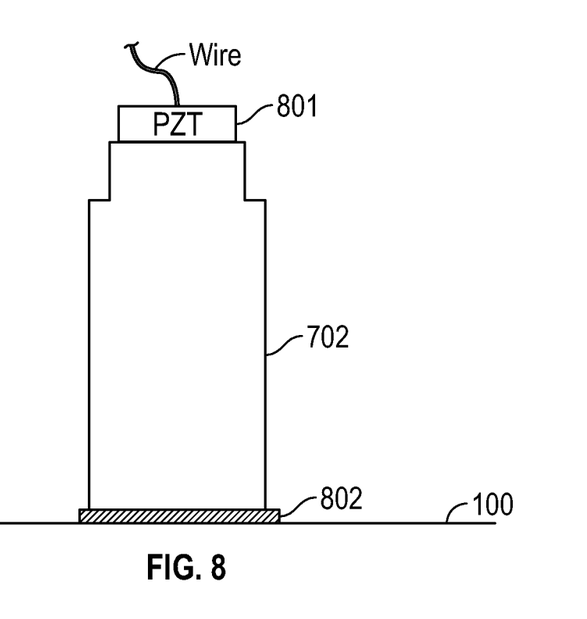
FIG. 8 illustrates an example of a waveguide attached to an SHM sensor, according to an exemplary embodiment of the present system and method.

As noted above, each SHM sensor may be placed on a waveguide, which is in turn fitted within a hole in the hinged top, so that the waveguides contact the tube sensor rather than the SHM sensors themselves. FIG. 8 illustrates an example of a waveguide attached to an SHM sensor, according to an exemplary embodiment of the present system and method. The waveguide 702 is a generally cylindrical metallic structure having a top surface on which the SHM sensor 801 (a PZT in this case) may be bonded, and a bottom surface that is placed in contact with the tube sensor 100 when the top is in the down position. The waveguide is formed with a length sufficient to focus stress waves directed into the tube sensor, while preventing direct contact between the SHM sensor and the tube sensor, which may damage the SHM sensor.

Any length and material for forming the waveguides is contemplated. As a non-limiting example, the waveguides may be aluminum and have a length of approximately 0.393 inches (10 mm). The waveguides may have a diameter that is larger than the SHM sensor it supports but that is small relative to the diameter of the tube sensor, such as shown in FIG. 8. As another non-limiting example, the waveguides may have a diameter of approximately 0.195 inches (4.95 mm). Depending on the frequency of the diagnostic signals used by the system, the dimensions of the waveguides may vary accordingly to optimize the energy transfer efficiency of the waveguides (i.e., maximize resonance).

Though not shown in FIG. 7A, the top 702 may hold the waveguides 702 therein in a spring-loaded manner, so that the compressive force pressing the waveguides against the tube sensor may be controlled. Also, a conductive ultrasound gel 802 may be applied between the sensor tube and waveguides, such as shown in FIG. 8, to improve the transmission of the stress waves between the waveguides and the tube sensor.

Figure 9:
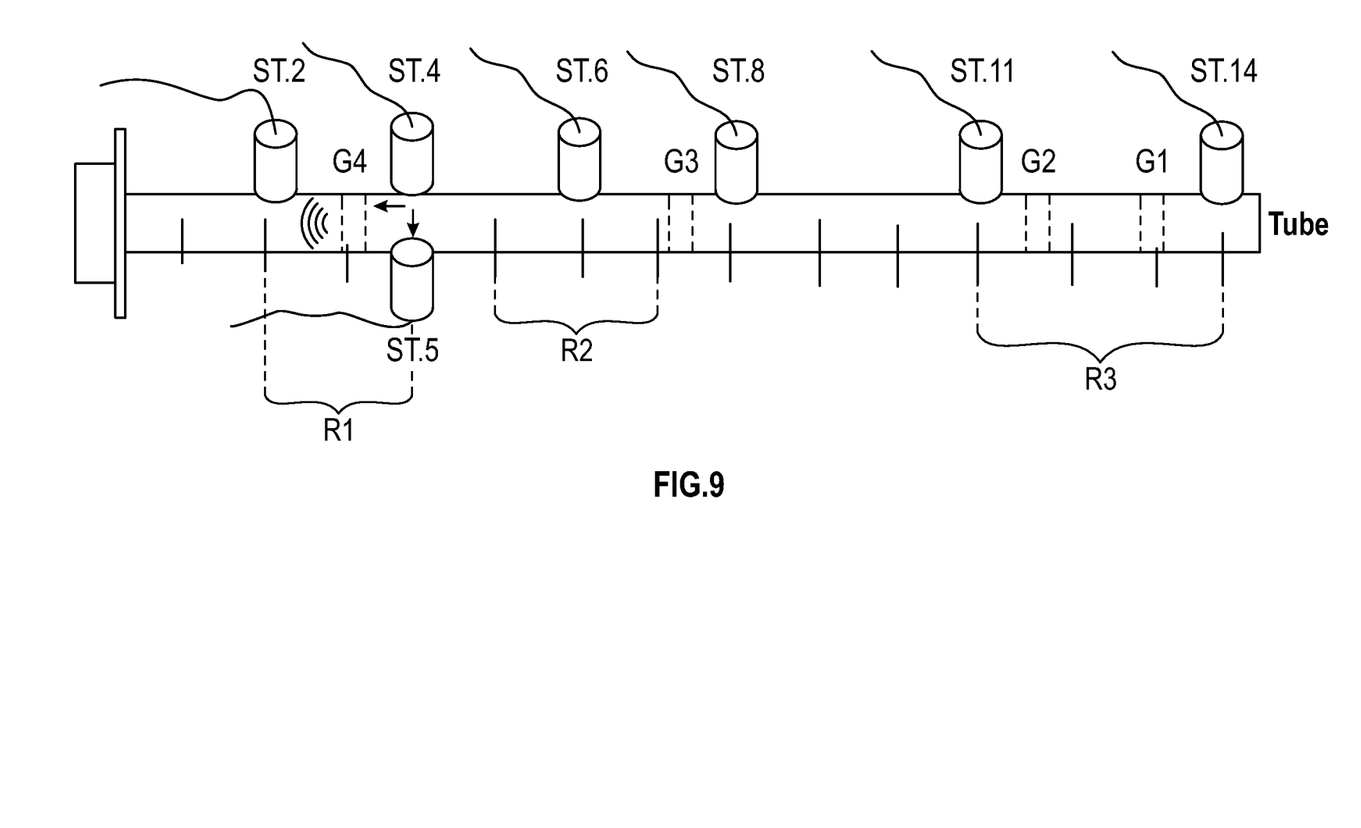
FIG. 9 illustrates a method of testing a tube sensor by dividing the tube sensor into three inspection regions, according to an exemplary embodiment of the present system and method.

FIG. 9 illustrates a method of testing a tube sensor by dividing the tube sensor into three inspection regions, according to an exemplary embodiment of the present system and method. For ease of description, an SHM sensor attached to a waveguide is hereinafter referred to as an "inspection station." The tube sensor under test has four glass joints G1, G2, G3, and G4, and positioned along the length of the tube sensor are a plurality of inspection stations ST. 2, ST. 4, ST.5, ST.6, ST.8, ST.11, and ST.14.

The inspection stations ST.4 and ST.2 are positioned to span a region R1 encompassing the glass joint G4. The inspection station ST.5 is positioned opposite to the inspection station ST.4. The inspection station ST.4 transmits stress waves through the tube sensor, and the inspection stations ST.2 and ST.5 detect the stress waves. Because the inspection station ST.5 is positioned directly opposite the inspection station ST.4, an analysis of the stress waves detected by the inspection station ST.5 provides better insight to the cross-sectional integrity of the tube sensor than an analysis of the stress waves detected by the inspection station ST.2 would provide, which may be advantageous, for example, if the test setup is being used to scan the tube sensor for the locations of the glass joints.

The inspection stations ST.6 and ST.8 are positioned to span a region R2 encompassing the glass joint G3. The inspection station ST.6 transmits stress waves through the tube sensor, and the inspection station ST.8 detects the stress waves (or vice versa). Inspection stations ST.11 and ST.14 are positioned to span a region R3 encompassing the glass joints G2 and G1. The inspection station ST.11 transmits stress waves through the tube sensor, and the inspection station ST.14 detects the stress waves (or vice versa). Thus, by using the method of FIG. 9, the transmission energy amplitude may be collected from each of the three regions R1, R2, and R3 and compared to determine which region, if any, is exhibiting energy loss. Because the transmission energy amplitudes are compared among the different regions, no baseline data is needed. That is, baseline signals need not be collected or stored beforehand for embodiments of the present system and method to diagnose the integrity of the tube sensor.

Figure 10:
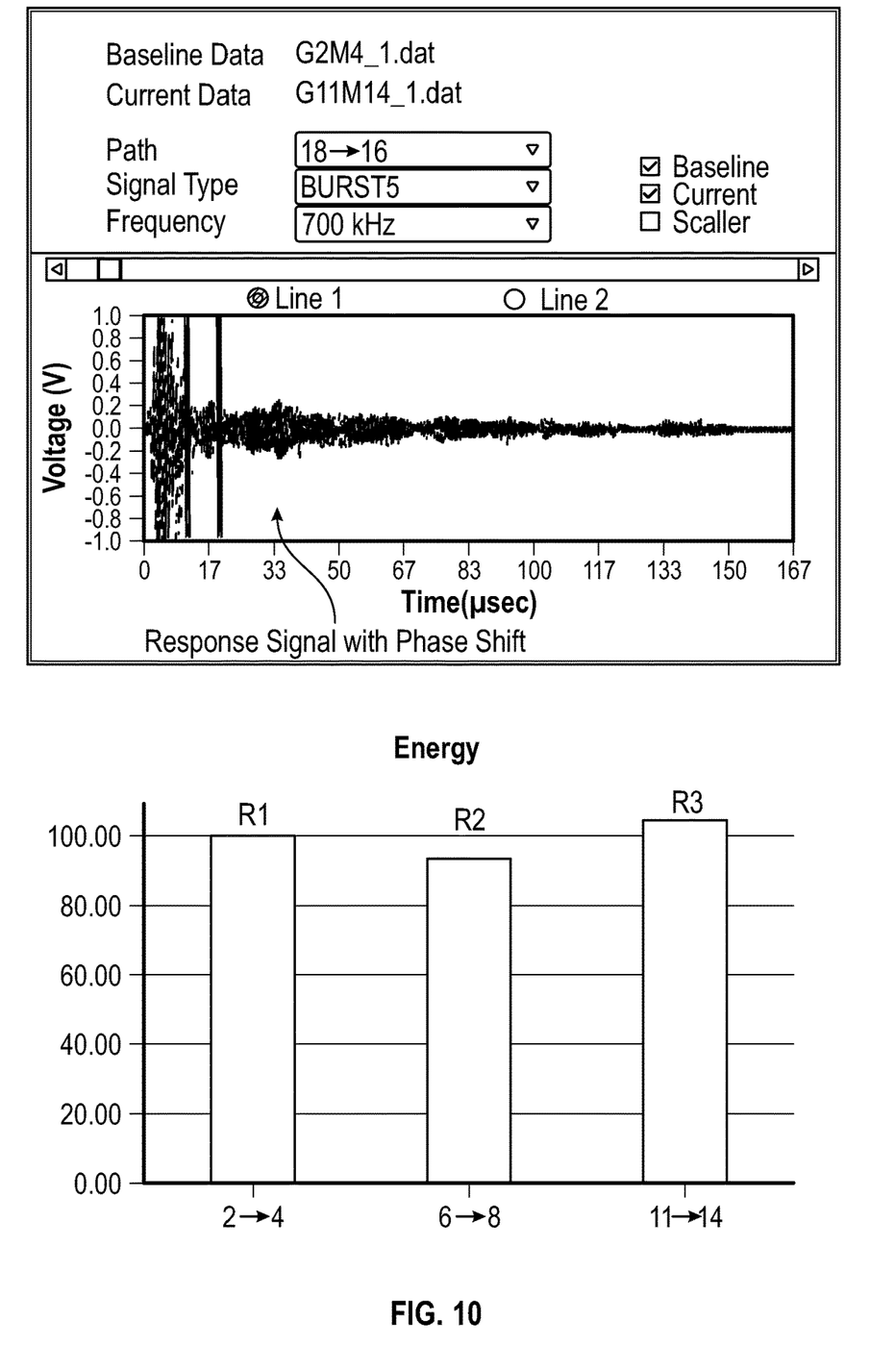
FIGS. 10 and 11 illustrate examples of energy profiles collected from an undamaged tube sensor and a damaged tube sensor, respectively, using the exemplary method of FIG. 9.
Figure 11:
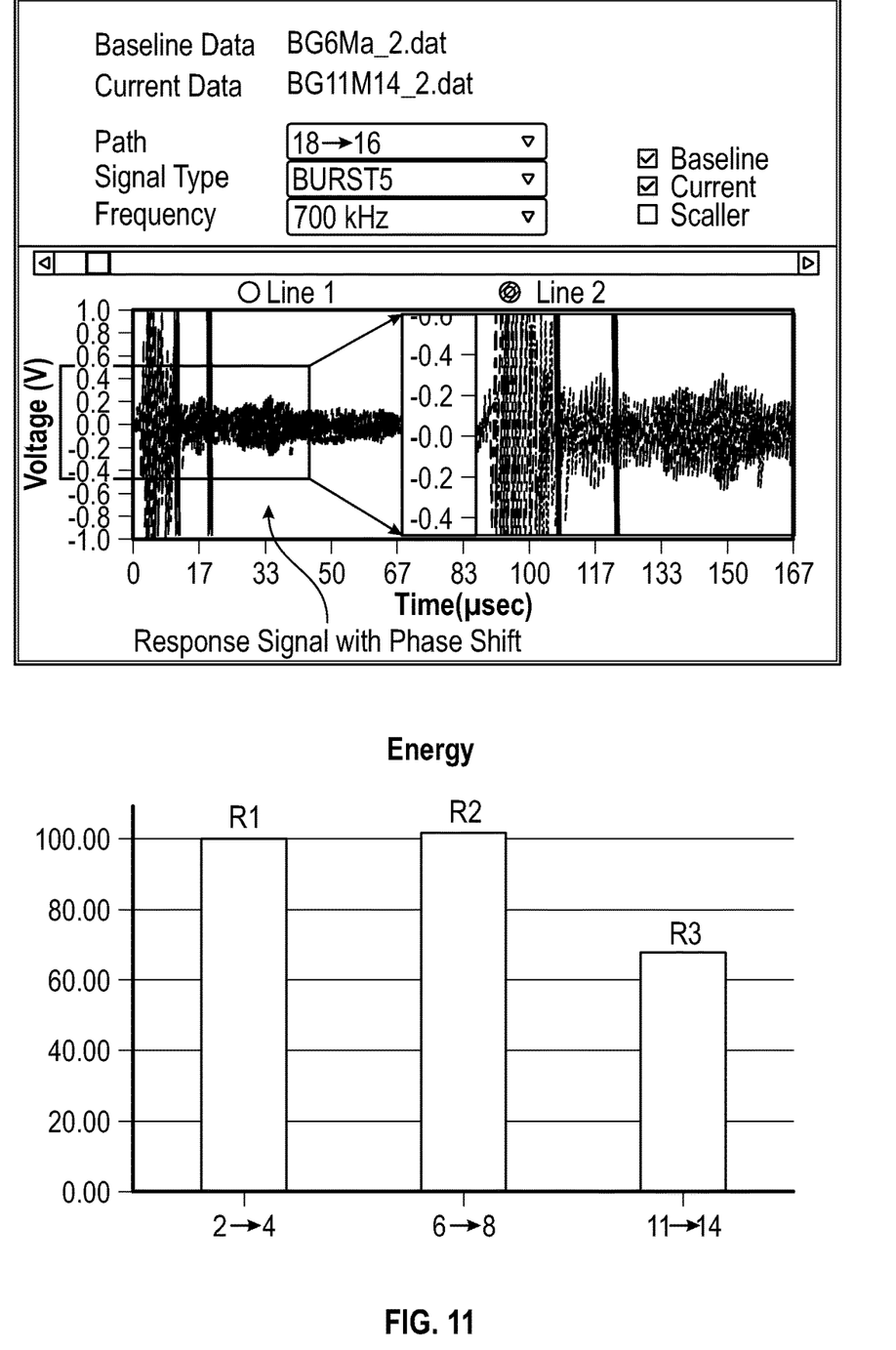

FIGS. 10 and 11 illustrate examples of acoustic energy profiles collected from an undamaged tube sensor and a damaged tube sensor, respectively, using the exemplary method of FIG. 9. For the undamaged tube sensor, FIG. 10 shows that the energy level of the response signals is generally consistent (e.g., within ±5% energy loss) among the three regions R1, R2, and R3, and that the response signal has a phase shift due to the distance from the inspection station to the glass joint. If the energy loss threshold for determining defects is set to 30%, the glass joints G1 through G4 would be considered healthy on the basis of the collected acoustic energy profile. The energy loss threshold, however, may be set to any value (e.g., ≥10%).

For the damaged tube sensor, however, FIG. 11 shows that the energy level of the response signals is generally consistent (~2% energy loss) among the regions R1 and R2 but drops significantly in the region R3 (~32% energy loss), and that the response signal has a phase shift due to the distance from the inspection station to the glass joint. Thus, if the energy loss threshold for determining defects is set to 30%, the glass joints G3 and G4 would be considered healthy on the basis of the collected acoustic energy profile (i.e., less than 30% energy loss), while one or both of the glass joints G1 and G2 in the region R3 would be considered damaged (i.e., equal to or greater than 30% energy loss). More fine scanning near the glass joints G1 and G2 may be performed to determine which of them is damaged (e.g., move the inspection station ST. 11 so that only G1 is between the inspection stations ST.11 and ST.14).

Figure 12:
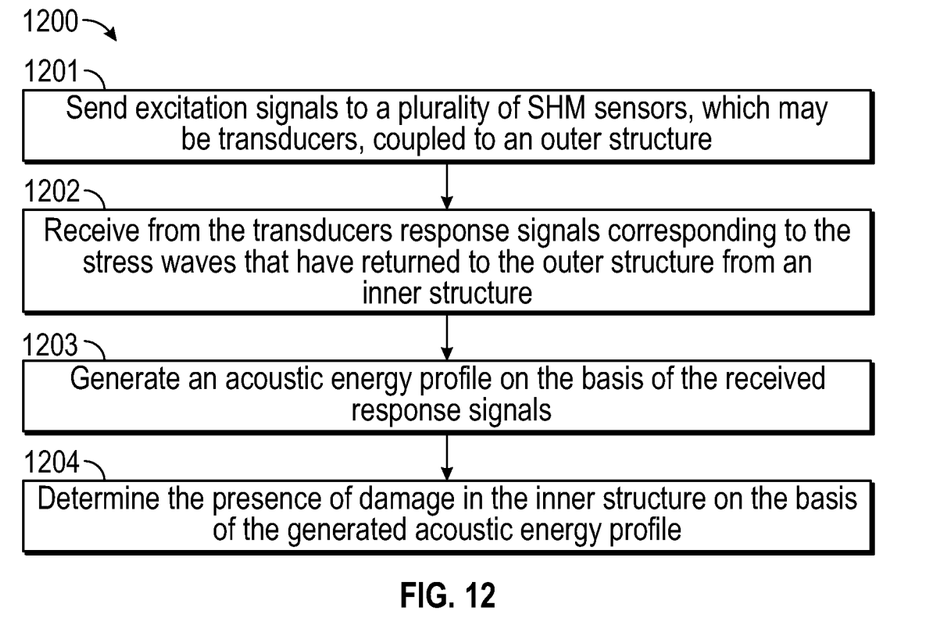
FIG. 12 illustrates a process flow diagram of operations for diagnosing the integrity of a tube sensor, according to an exemplary embodiment of the present system and method.

FIG. 12 illustrates a process flow diagram of operations for diagnosing the integrity of a tube sensor, according to an exemplary embodiment of the present system and method. The operations, for example, may be performed by an analyzer, such as the computer 640 shown in FIG. 6. To illustrate, the analyzer sends excitation signals to a plurality of SHM sensors, which may be transducers, (at 1201) coupled to an outer structure. The excitation signals cause the transducers to generate stress waves within the outer structure. The stress waves propagate through the outer structure and into an inner structure and back to the outer structure. The analyzer receives from the transducers response signals corresponding to the stress waves that have returned to the outer structure from the inner structure (at 1202). The analyzer then determines the presence of damage in the inner structure on the basis of the received response signals, which may include generating an acoustic energy profile on the basis of the received response signals (at 1203) and determining the presence of damage in the inner structure on the basis of the generated acoustic energy profile (at 1204). For example, the analyzer may compare the acoustic energy levels corresponding to different regions of the outer structure with one another to determine if a significant dip in the energy level of the acoustic energy profile (e.g., below an energy loss threshold) exists, which may indicate damage in the inner structure.

Waveforms generated by the SHM sensors and transmitted into the tube sensor may be determined relative to a single resonant frequency of the sensor tube, or some combination of frequencies, where any such combination is contemplated. As an example, one frequency f may be chosen, with the waveforms contained within a spectrum spanning 0.85 f to 1.15 f, i.e., ±15% of the frequency f. The frequency f may be between 200 KHz and 1 MHz (e.g., 700 KHz). However, embodiments of the present system and method are not limited to these values, and any waveform shapes and amplitudes, covering any spectrum, that are suitable for detecting damage in the tube sensor are contemplated.

The tube sensor may also be tested at any temperature. More specifically, the tube sensor may be heated or cooled to any desired temperature, and then tested as described above, so that the performance over temperature may be determined. This may allow for easier or more accurate finding of any defects. For example, the ceramic inner tube may expand with increasing temperature and separate further from the alloy outer tube, thus worsening any defects and making them easier to detect. Embodiments of the present system and method contemplate conducting any of the above tests at any temperature or range of temperatures. For instance, the specimen may be tested at ambient temperature and operating temperature, and at any regular intervals in between.

Although the present system and method are exemplarily described as being applied to tube sensors, they are not limited thereto. The present system and method may be applied to any test specimen with an outer structure coupled to an inner structure to detect defects in the inner structure by application of sensors to only the outer structure. Accordingly, damage to the inner structure can be determined in a nondestructive manner even when the outer body completely surrounds the inner structure, making visual inspection of the inner structure impossible or impractical.

The foregoing description, for purposes of explanation, used specific nomenclature to provide a thorough understanding of the present system and method. However, it will be apparent to one skilled in the art that the specific details are not required in order to practice the present system and method. Thus, the foregoing descriptions of specific embodiments of the present system and method are presented for purposes of illustration and description. They are not intended to be exhaustive or to limit the present system and method to the precise forms disclosed. Many modifications and variations are possible in view of the above teachings. For example, any relationships between damage index and damage size are contemplated, and these relationships can be of any form. As non-limiting examples, the SHM sensors can be PZT or any other types of sensors, applied to the test specimen in any number and positions so as to accurately detect damage. Waveguides may be used but are not required, and may be of any shapes and dimensions, when used. Waveforms generated by the sensors may be any waveforms, of any shape and frequencies. The damage detection methods and apparatuses may be applied to any test specimen that has an outer structure coupled to an inner structure, regardless of the specific geometry and materials it uses. The embodiments were chosen and described in order to best explain the principles of the present system and method and their practical applications, to thereby enable others skilled in the art to best utilize the present system and method and various embodiments with various modifications as are suited to the particular use contemplated. The various features of the disclosed embodiments and examples may be mixed and matched in any manner or combination to form further embodiments contemplated by the present disclosure.

What is claimed is:

1. A structural health monitoring apparatus, comprising:
   a plurality of transducers coupled to a structure, the structure comprising an outer structure having a hollow cavity and an inner structure extending into the cavity, the outer structure surrounding and coupled to the inner structure by a plurality of couplings that are separate from and discontinuous with each other, the transducers further coupled to only the outer structure and near one or more of the couplings so as to transmit stress waves through the outer structure, through at least one of the couplings and into the inner structure, and back into the outer structure through at least one of the couplings, so as to receive the transmitted stress waves from the outer structure after they have passed through the inner structure; and
   an analyzer configured to detect a presence of damage within the inner structure according to the received transmitted stress waves from the outer structure.

2. The apparatus of claim 1, wherein the analyzer is further configured to detect the damage without reference to a baseline signal.

3. The apparatus of claim 1, wherein each of the transducers is configured for coupling to the outer structure through a waveguide.

4. The apparatus of claim 1, wherein the analyzer is further configured to generate an acoustic energy profile on the basis of the received transmitted stress waves from the outer structure.

5. The apparatus of claim 4, wherein the generated acoustic energy profile represents acoustic energy levels corresponding to a plurality of regions along a length of the structure.

6. The apparatus of claim 5, wherein the analyzer is further configured to:
   compare the acoustic energy levels of differing regions, and
   determine the presence of damage in one or more of the regions on the basis of the comparison and an energy loss threshold.

7. A method of conducting structural health monitoring, the method comprising:
   providing a structure comprising an outer structure having a hollow cavity and an inner structure extending into the cavity so that the outer structure surrounds and is coupled to the inner structure, wherein the inner and outer structures are coupled by a plurality of couplings that are separate from and discontinuous with each other;
   sending excitation signals to a plurality of transducers coupled to the outer structure and near one or more of the couplings to cause the transducers to generate stress waves within the outer structure, so that the stress waves propagate through the outer structure, into the inner structure through at least one of the couplings, and back into the outer structure through at least one of the couplings;
   receiving from the transducers response signals corresponding to the stress waves that have returned to the outer structure from the inner structure; and determining a presence of damage in the inner structure on the basis of the received response signals.

8. The method of claim 7, wherein the determining further comprises determining the presence of damage according to an energy loss of the stress waves, without reference to a baseline signal.

9. The method of claim 7, wherein determining the presence of damage in the inner structure includes generating an acoustic energy profile on the basis of the received response signals.

10. The method of claim 9, wherein the generated acoustic energy profile represents acoustic energy levels corresponding to a plurality of regions along a length of the structure.

11. The method of claim 10, wherein determining the presence of damage in the inner structure includes:
- comparing the acoustic energy levels of differing regions, and determining the presence of damage in one or more of the regions on the basis of the comparison and an energy loss threshold.

\* \* \* \* \*